US011783710B2

United States Patent
Bose et al.

(10) Patent No.: US 11,783,710 B2
(45) Date of Patent: Oct. 10, 2023

(54) APPEARANCE AND MOVEMENT BASED MODEL FOR DETERMINING RISK OF MICRO MOBILITY USERS

(71) Applicant: Humanising Autonomy Limited, London (GB)

(72) Inventors: Raunaq Bose, London (GB); Leslie Cees Nooteboom, London (GB); Maya Audrey Lara Pindeus, London (GB)

(73) Assignee: HUMANISING AUTONOMY LIMITED, London (GB)

( * ) Notice: Subject to any disclaimer, the term of this patent is extended or adjusted under 35 U.S.C. 154(b) by 51 days.

(21) Appl. No.: 17/357,446

(22) Filed: Jun. 24, 2021

(65) Prior Publication Data

US 2021/0403003 A1  Dec. 30, 2021

Related U.S. Application Data

(60) Provisional application No. 63/043,702, filed on Jun. 24, 2020.

(51) Int. Cl.
G08B 23/00 (2006.01)
G08G 1/16 (2006.01)
(Continued)

(52) U.S. Cl.
CPC ............ G08G 1/166 (2013.01); B60W 40/09 (2013.01); B60W 50/14 (2013.01); G06N 20/00 (2019.01);
(Continued)

(58) Field of Classification Search
CPC ................ B60W 40/09; B60W 50/14; B60W 2040/0863; B60W 2540/26;
(Continued)

(56) References Cited

U.S. PATENT DOCUMENTS

2014/0044310 A1  2/2014  Schamp et al.
2016/0318445 A1  11/2016  Sugimoto
(Continued)

OTHER PUBLICATIONS

Fang et al., "Intention Recognition of Pedestrians and Cyclists by 2D Pose Estimation", IEEE Transactions on Intelligent Transportation Systems, IEEE, Piscataway, NJ, USA, vol. 21, No. 11, Oct. 18, 2019 (Oct. 18, 2019), pp. 4773-4783, XP011818705, ISSN: 1524-9050, DOI: 10.1109/TITS.2019.2946642 [retrieved on Oct. 30, 2020].

(Continued)

*Primary Examiner* — Anh V La
(74) *Attorney, Agent, or Firm* — FENWICK & WEST LLP (57) ABSTRACT

The systems and methods disclosed herein provide a risk prediction system that uses trained machine learning models to make predictions that a VRU will take a particular action. The system first receives, in a video stream, an image depicting a VRU operating a micro-mobility vehicle and extract the depictions from the image. The extraction process may be determined by bounding box classifiers trained to identify various VRUs and micro-mobility vehicles. The system feeds the extracted depictions to machine learning models and receives, as an output, risk profiles for the VRU and the micro-mobility vehicle. The risk profile may include data associated with the VRU/micro-mobility vehicle determined based on classifications of the VRU and the micro-mobility vehicles. The system may then generate a prediction that the VRU operating the micro-mobility vehicle will take a particular action based on the risk profile.

20 Claims, 7 Drawing Sheets

(51) Int. Cl.

| | |
|---|---|
| *G06N 20/00* | (2019.01) |
| *G06V 20/52* | (2022.01) |
| *B60W 40/09* | (2012.01) |
| *B60W 50/14* | (2020.01) |
| *G08G 1/017* | (2006.01) |
| *G06V 10/80* | (2022.01) |
| *G06V 20/40* | (2022.01) |
| *G06V 20/58* | (2022.01) |
| *G06V 40/20* | (2022.01) |
| *B60W 40/08* | (2012.01) |

(52) U.S. Cl.
CPC ............ *G06V 10/809* (2022.01); *G06V 20/46* (2022.01); *G06V 20/52* (2022.01); *G06V 20/58* (2022.01); *G06V 40/20* (2022.01); *G08G 1/0175* (2013.01); *B60W 2040/0863* (2013.01); *B60W 2540/26* (2013.01); *B60W 2540/30* (2013.01); *G06V 2201/07* (2022.01); *G06V 2201/08* (2022.01)

(58) Field of Classification Search
CPC ... B60W 2540/30; G06N 20/00; G06V 20/52; G06V 2201/07; G06V 2201/08; G06V 10/809; G06V 20/46; G06V 20/58; G06V 40/20; G08G 1/0175; G08G 1/166; G06K 9/6292

USPC ....... 340/576, 573.4, 573.1, 425.5, 435, 436
See application file for complete search history.

(56) References Cited

U.S. PATENT DOCUMENTS

| | | |
|---|---|---|
| 2018/0233048 A1 | 8/2018 | Andersson et al. |
| 2019/0258878 A1* | 8/2019 | Koivisto .............. G06V 10/762 |
| 2020/0019627 A1* | 1/2020 | Stenneth ................... G06T 7/70 |
| 2021/0150752 A1* | 5/2021 | Ayvaci ..................... G06N 3/08 |
| 2021/0156960 A1* | 5/2021 | Popov ..................... G01S 13/89 |
| 2021/0201052 A1* | 7/2021 | Ranga ..................... G06N 3/08 |

OTHER PUBLICATIONS

International Search Report and Written Opinion, Patent Cooperation Treaty Application No. PCT/IB2021/000433, dated Oct. 25, 2021, 17 pages.

Raj et al., "Helmet violation processing using deep learning", 2018 International Workshop on Advanced Image Technology (IWAIT), IEEE, Jan. 7, 2018 (Jan. 7, 2018), pp. 1-4, XP033352541, DOI: 10.1109/IWAIT.2018.8369734 [retrieved on May 30, 2018].

* cited by examiner

APPEARANCE AND MOVEMENT BASED MODEL FOR DETERMINING RISK OF MICRO MOBILITY USERS

CROSS REFERENCE TO RELATED APPLICATIONS

This application claims the benefit of U.S. Provisional Application No. 63/043,702, filed Jun. 24, 2020, which is incorporated by reference herein in its entirety.

BACKGROUND

Humans often estimate the rough ability of a micro-mobility vehicle riders by looking at the rider for a very small period of time. For example, automobile drivers tend to form such an assessment out of necessity on the road, where many different types of cyclists share the road with automobiles, and drivers gauge whether giving wide berth or small clearance is necessary depending on how likely the driver perceives the cyclist to be to enter the driver's path. Autonomous and semi-autonomous vehicle technology, as well as ADAS (advanced driver-assistance systems) often use cameras to detect human activity near a vehicle and to assess risk therefrom. While some systems provide algorithms to predict pedestrian behavior, current AI (artificial intelligence) based models are ill-equipped to determine the risk posed by users of micro mobility vehicles (e.g., bicycles and scooters). While machine-learning systems that drive autonomous vehicles and vehicles with ADAS seek to solve this problem, these machine-learning systems predict behavior of micro-mobility riders without regard for attributes of a micro-mobility vehicle itself, thus resulting in inaccurate predictions of human behavior.

SUMMARY

Systems and methods are disclosed herein to use machine learning to determine a risk profile associated with a vulnerable road user (VRU) operating a micro-mobility vehicle. The determined risk may inform various activities, such as movement or other activity of an autonomous or semi-autonomous vehicle, alerts in an alert system, event logging, sending predictions of near misses to insurance companies, using dashcam footage to track commercial driver activities, and so on. The term micro-mobility vehicle, as used herein, may refer to any vehicle, whether motorized or non-motorized, that is smaller than a standard car. Examples of micro-mobility vehicles include bicycles, tricycles, unicycles, scooters, segways, hoverboards, and similar devices that are designed to transport one or a small number of users. Riders of micro-mobility vehicles may be referred to as vulnerable road users, or VRUs.

The systems and methods disclosed herein provide a risk prediction system that uses one or more trained machine learning models to make predictions that a VRU will take a particular action. The system may first receive, in a video stream, an image depicting a VRU operating a micro-mobility vehicle and extract the depiction of the VRU and the depiction of the micro-mobility vehicle from the image independently, or depicted as a single object (the VRU operating the micro-mobility as a whole). The extraction process may be determined by one or more detection models (e.g. bounding box classifiers or semantic segmentation models) trained to identify various VRUs and micro-mobility vehicles. The system may feed the extracted depictions of the VRU and the micro-mobility vehicles to one or more machine learning models and receive, as an output, classifications or probability distributions of the person and the micromobility vehicle which are then further used to generate a risk profile for the VRU. The risk profile may include characteristics representative of the VRU/micro-mobility vehicle determined based on the classifications or probability distributions. For example, a micro-mobility vehicle may be classified as a skateboard by a machine learning model, and the risk profile may include configurations corresponding to a skateboard, such as brake capacity, power, range of movement, etc. Combined with other appearance-based classifications of the person, their movement and other modules describing the person and micro-mobility vehicle, the system may then generate a prediction that the VRU operating the micro-mobility vehicle will take a particular action or pose a particular risk based on the risk profiles for the VRU.

The systems and methods disclosed herein provides an advantageous technical system that determines risk of a VRU operating a micro-mobility vehicle. Conventionally, autonomous and semi-autonomous vehicle technology, as well as technology relating to alert systems that generate alerts based on the surroundings of a vehicle, often use cameras to detect human activity near a vehicle and to assess risk therefrom. While some systems provide algorithms to predict pedestrian behaviors, current machine learning models are ill-equipped to determine the risk posed by VRUs operating a micro-mobility vehicle. The disclosed systems and methods use machine learning models to generate comprehensive risk profiles of the VRU and the micro-mobility vehicle and the risk profiles may be used to predict behaviors of the VRU operating the micro-mobility vehicle. The predictions may assist making decisions and may be used for a variety of purposes, such as guiding decisions of a vehicle, generating alerts, sending predictions of near misses to insurance companies, using dashcam footage to track truck driver activities, logging events, etc.

Commonly owned U.S. patent application Ser. No. 16/857,645, filed on Apr. 24, 2020, and titled "Tracking Vulnerable Road Users Across Image Frames Using Fingerprints Obtained From Image Analysis", (hereafter sometimes referred to as "the Tracking Patent Application") which discloses a multi-task model with different branches each trained to form a prediction about a vulnerable road user (VRU), is hereby incorporated by reference herein in its entirety. Systems and methods for fingerprinting and tracking VRUs are also disclosed in the Tracking Patent Application. Wherever the term VRU is used therein, the disclosure equally applies to micro-mobility vehicles being operated by those VRUs. That is, tracking VRUs may be performed in a manner consistent with the disclosure of tracking human beings in the Tracking Application. Thus, tracking and predictions using the modules and multi-task model and any other models disclosed therein are enabled for micro-mobility vehicles. Various exemplary predictions that relate to micro-mobility vehicles will now be discussed.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
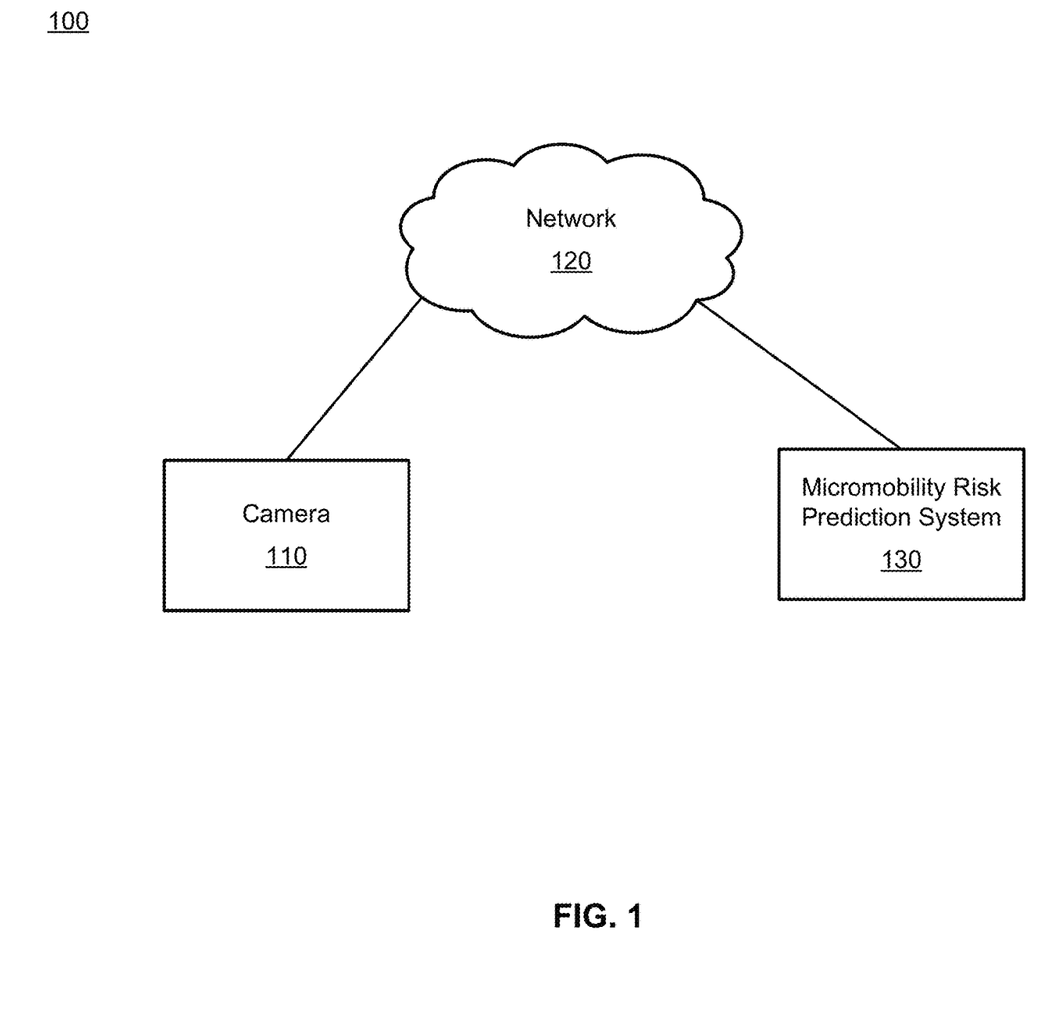
FIG. 1 depicts an exemplary system environment for a micromobility risk prediction system, in accordance with one embodiment.

FIG. 1 depicts an exemplary system environment for a micromobility risk prediction system, in accordance with one embodiment. Environment 100 includes camera 110, network 120, and micromobility risk prediction system 130. Camera 110 captures images or records video streams of VRUs and micro-mobility vehicles and transmits data via network 120 to micromobility risk prediction system 130. Camera 110 is typically operably coupled to a vehicle, such as an autonomous or semi-autonomous vehicle. The vehicle may be an automobile (that is, any powered four-wheeled or two-wheeled vehicle). Camera 110 may be integrated into the vehicle, or may be a standalone (e.g., dedicated camera) or integrated device (e.g., client device such as a smartphone or dashcam mounted on vehicle). While only one camera 110 is depicted, any number of cameras may be operably coupled to the vehicle and may act independently (e.g., videos/images are processed without regard to one another) or in concert (e.g., videos/images may be captured in sync with one another and may be stitched together to capture wider views).

Network 120 may be any data network, such as the Internet. In some embodiments, network 120 may be a local data connection to camera 110. In one embodiment, network 120 provides the communication channels via which the other elements of the environment 100 communicate. The network 120 can include any combination of local area and/or wide area networks, using both wired and/or wireless communication systems. In one embodiment, the network 120 uses standard communications technologies and/or protocols. For example, the network 120 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Micromobility risk prediction system 130 may take the images or videos transmitted from the camera 110 and use one or more trained machine learning models for generating a prediction that a VRU operating a micro-mobility vehicle will exhibit a particular behavior. In one embodiment, micromobility risk prediction system 130 may be installed on-board a vehicle where camera 110 is located, such as on a dedicated chip or device, or being co-installed on a client device or other processing circuitry with camera 110. Micromobility risk prediction system 130 receives the data and may first identify in the images/videos VRUs and micromobility vehicles. Micromobility risk prediction system 130 may then extract the identified depictions of the VRUs and micro-mobility vehicles and perform classifications on the depictions. For example, a micromobility vehicle may be classified based on types such as bicycles, scooters, skateboard, etc. and different types of micromobility vehicles may be associated with different vehicle configurations and capabilities. As another example, a VRU may be classified based on movements and appearances such as clothing, and each classification of the VRU may be also associated with some characteristics describing potential future trajectory of the VRU. Based on the classification results, micromobility risk prediction system 130 may generate a risk profile for each VRU and micro-mobility vehicle identified in the received images. Based on the determined risk profiles, the micromobility risk prediction system 130 determines therefrom probabilities that VRUs and micro-mobility vehicles shown in the images are likely to exhibit a behavior (e.g. predicting speed of the VRU, predicting whether the VRU is likely to enter the driver's path). Details about how these probabilities are determined are described in further detail below with respect to FIGS. 2-7. In some embodiments, while not depicted, Micromobility risk prediction system 130 transmits the predictions to a control system, where the control system takes action based on the predictions (e.g., alter a vehicle's movement or function, alert a vehicle operator, etc.).

Figure 2:
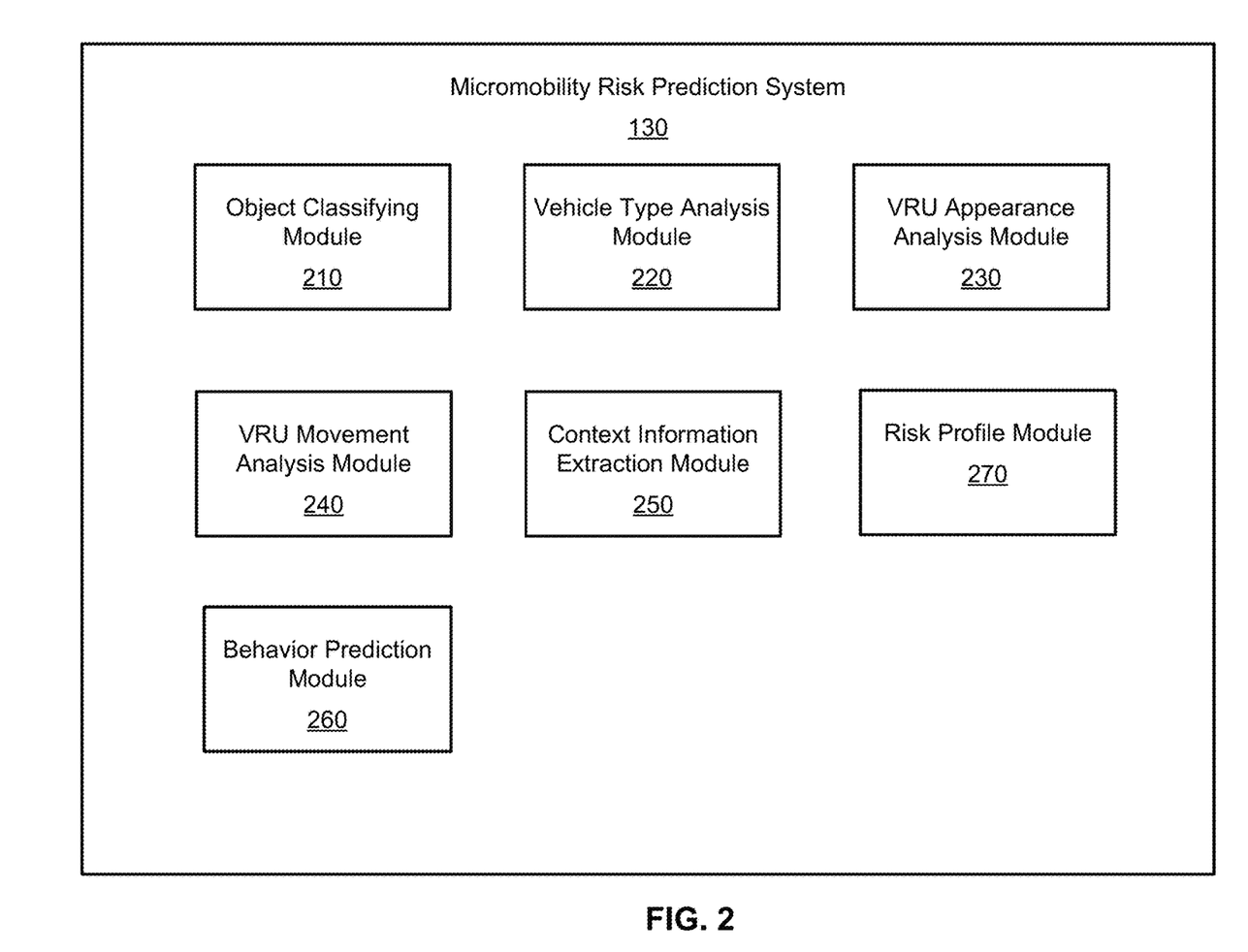
FIG. 2 depicts exemplary modules of a Micromobility risk prediction system, in accordance with one embodiment.

FIG. 2 illustrates exemplary modules of a micro-mobility risk prediction system 130, in accordance with one embodiment. As depicted in FIG. 2, micromobility risk prediction system 130 includes object classifying module 210 that identifies and extracts objects such as VRUs and micromobility vehicles in an image, vehicle type analysis module 220 performs analysis and classifications on vehicle types, VRU appearance analysis module 230 performs analysis and classifications on appearances of VRUs, VRU movement analysis module 240 performs analysis and classifications on gestures of VRUs, context information extraction module 250 extracts from images contextual information, behavior prediction module 260 consolidates information from the other modules and makes predications that a VRU will exhibit a particular behavior, and applications 270 includes a variety of use cases where the prediction may be applied. The modules and databases depicted in FIG. 2 are exemplary and used for convenience of illustration; more or fewer modules, and/or different modules, may be used to achieve any of the activity described herein.

Object classifying module 210 identifies and extracts objects such as VRUs and micromobility vehicles given an image (e.g. received from camera 110). Object classifying module 210 may use a trained machine learning model to perform object detection in the given image. For example, the machine learning model may be one or more, or a combination of the following machine learning algorithms such as convolutional neural network (CNN), deep neural network, classifiers such as support vector machines (SVM), k-nearest neighbors (KNN), etc. The machine learning model may take the image as input, and output one or more bounding boxes (or any closed shapes) around detected objects in the image. In one embodiment, where bounding box can be used, any polygon is implied, such as a bounding polygon of any shape that forms a border around a portion of an image. The model may further label the detected objects with labels identifying whether an object is a VRU or a micro-mobility vehicle.

Figure 3:
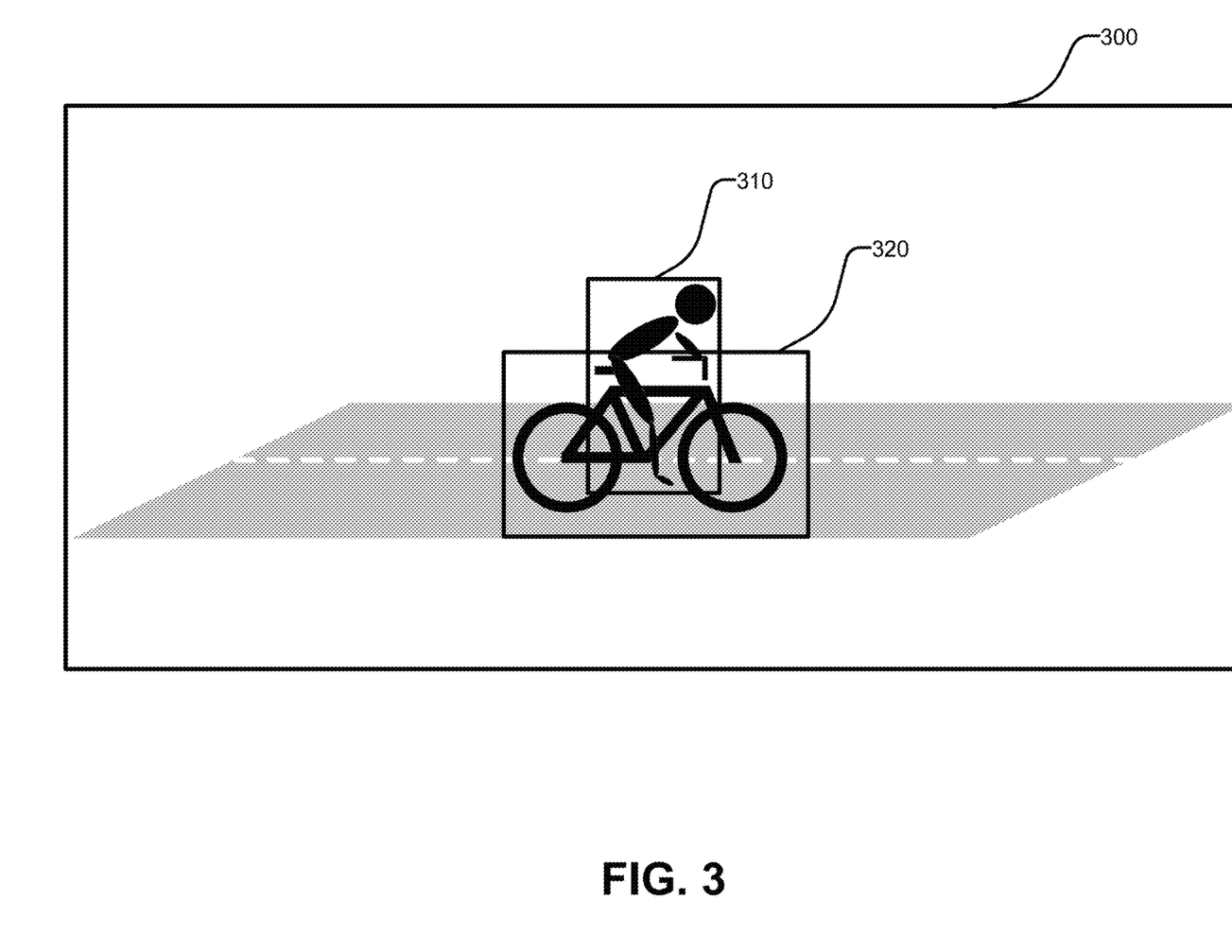
FIG. 3 depicts an exemplary embodiment of identifying a VRU and a micro-mobility vehicle in an image using bounding polygon classifiers, in accordance with one embodiment.

To illustrate with an example, FIG. 3 depicts an exemplary image processed by the object classifying module 210. Image 300 represents a frame, such as a full frame of a video captured by image sensors of camera 110. Image 300 includes one or more VRUs and micromobility vehicles. In one embodiment, the image 300 is fed in its entirety as input into object classifying module 210 which responsively applies one or more bounding boxes such as bounding box 310 and bounding box 320, where bounding box 310 identifies the VRU and the bounding box 320 identifies the micromobility vehicle which is a bicycle illustrated as an example in the image. Object classifying module 210 may process the image by detecting the VRUs and micromobility vehicles in the images and applying bounding boxes 310 and 320 around those VRUs and micromobility vehicles. As will be explained further below, the bounding boxes may be used as input to the model(s) instead of, or in addition to, the images themselves, thus saving on processing power and leading to more accurate model outputs by removing noise from the full images.

Vehicle type analysis module 220 identifies vehicle types by performing analysis and classifications using machine learning models on the bounding boxes identified as micromobility vehicles. Each type of micro-mobility vehicle may have a different impact on current movement and future behavior of a micro-mobility vehicle. For example, different micro-mobility vehicles have different movement capabilities. An electric bike will accelerate much faster than a cruiser bike. Road skis will be much more difficult to brake immediately or take sharp turns than a pogo stick. There are also different types of infrastructure for certain types of micro-mobility. An e-scooter might alternate between sidewalk, bicycle path and the road more frequently than mobility aids such as wheelchairs. The different movement capabilities affect the risk that certain behavior might pose. Further examples of micro-mobility vehicle types are as follows: Racing bike, Electric bike, City bike, 'cruiser' bike/Dutch bike, Cycle-share bike, Cargo bike, Tandem bike, Skateboard, E-scooter, Segways, Rollerblades, Mobility aids, One-wheel skateboards, Road ski's with wheels, Jetpack, Reclining bike, Pogo stick, Exoskeletons, Motorized luggage, animals used for transportation (e.g., horses, mules), and so on.

Figure 4:
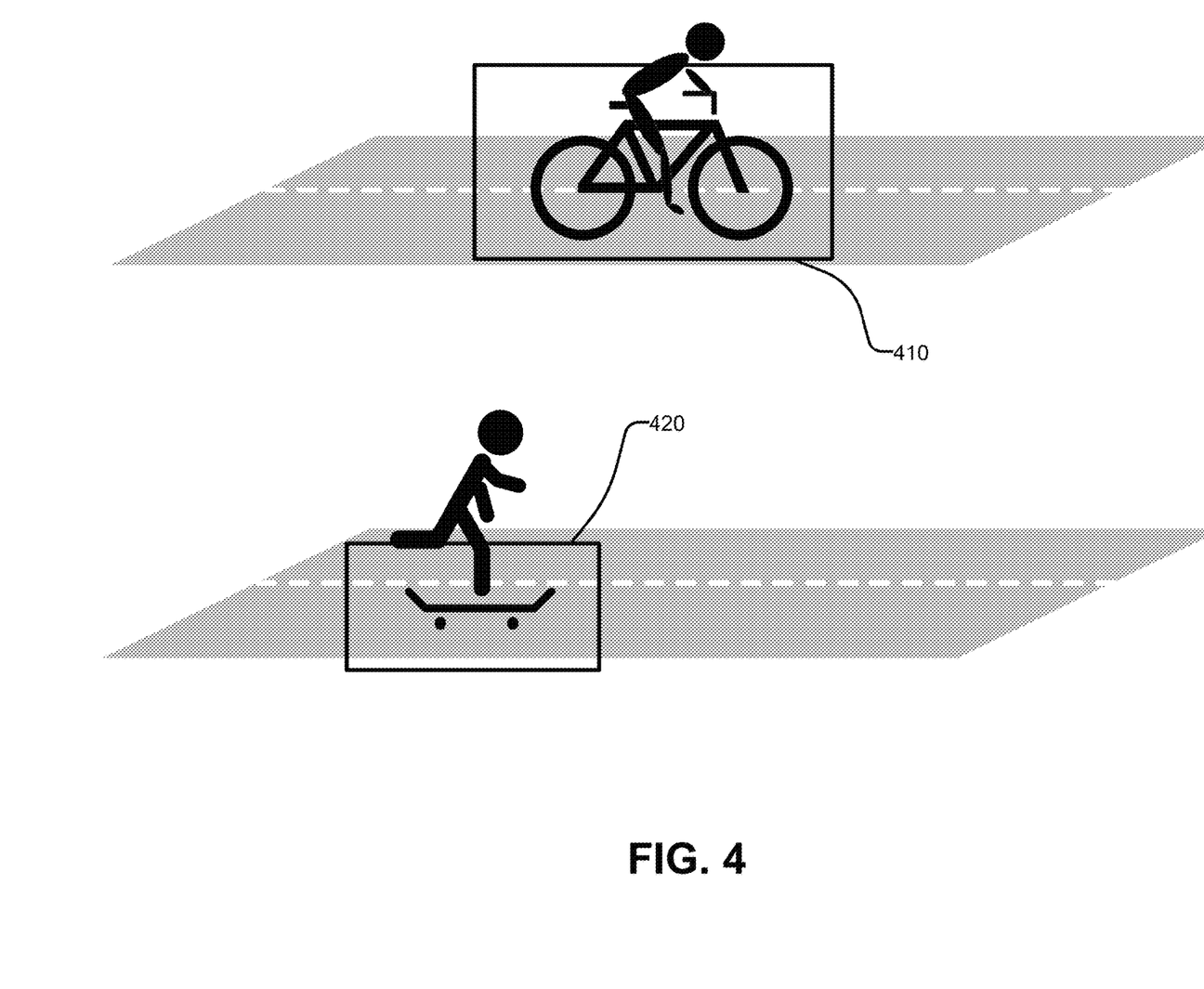
FIG. 4 depicts an exemplary embodiment of identifying a type of the micro-mobility vehicle in an image, in accordance with one embodiment.

Vehicle type analysis module 220 may use a trained machine learning model to generate classifications (or probability distributions, or a combination of both) to identify one or more micromobility vehicle type based on input of an image (or a bounding box of a micro-mobility vehicle within an image). For example, as illustrated in FIG. 4, vehicle type analysis module 220 may use bounding boxes 410 and 420 as input and output a classification (or probability distribution) for a type of the micromobility vehicles identified in the bounding boxes. For example, content within the bounding box 410 may be classified as "bicycle" and content within the bounding box 420 may be classified as a "skateboard." In one embodiment the machine learning model is a supervised model trained using labelled training data (e.g. labeled images of various types of micromobility). In an embodiment, different machine learning models, or different branches of a multi-task machine learning model, may be used to directly predict each capability of the micro-mobility vehicle. The machine learning model may output a set of probabilities that each corresponding to a probability that the micromobility vehicle belongs to a type group. In some embodiments, the machine learning model may determine a set of confidence scores indicative of likelihoods that the micromobility vehicle belongs to one or more classification categories. The vehicle type analysis module 220 may determine one or more types for the micromobility vehicle based on the set of probabilities (or based on confidence scores). The system may predict therefrom a variety of information, including range of movement, speed capabilities, braking capabilities, acceleration capabilities, and any other movement capabilities of the micro-mobility vehicle. The predicted information may be consolidated into a risk profile for the micromobility vehicle by the risk profile module 270, which is discussed in further details below.

VRU appearance analysis module 230 performs analysis and classifications on appearances of VRUs. In one embodiment, VRU appearance analysis module 230 may use one or more machine learning models that are trained to predict user behavior based on VRU appearance. The appearance of the VRU on the type of micro-mobility may impact predictions (e.g., how a vehicle should expect to respond). Non-exhaustive examples of VRU appearances and their practical impact on predictions follow. A cyclist in full Lycra on a racing bike is likely to move faster than someone in a dressy suit on a city share bike. A person in a police outfit on a horse will show gestures that a driver needs to obey more than a street entertainer dancing on a Segway. VRU appearance analysis module 230 may identify the VRU as wearing a hoodie, and the VRU's view can be blocked by the hoodie, which means that the VRU may have obstructed vision with respect to a vehicle. Someone checking their smartphone while on an electric skateboard might not brake as quickly when approaching an intersection.

The VRU appearance analysis module 230 may train and use one or more machine learning models to predict user behaviors taking an image and/or bounding box of a VRU as input (e.g., along with an image and/or bounding box and/or other auxiliary information). In one embodiment, the machine learning models are trained with training data including labeled images. For example, training data may include images depicting professional cyclists and images depicting amateur riders, and each image is labeled accordingly. The training data may be fed into machine learning models such as Convolutional Neural Network (CNN) which learns the different patterns in the appearances of professional cyclists and amateurs. Various machine learning models may be trained to identify (or generate probability distributions) different characteristics in appearances (e.g. a model that classifies professional/amateur, a model classifies holding/not holding a smartphone, etc.) The VRU appearance analysis module 230 may use the trained machine learning models to classify VRU appearance, or a prediction (made based on the VRU appearance) directly. In one embodiment, the machine learning models may output a set of probabilities, each probability corresponding to a characteristic that the VRU is identified to satisfy. In some embodiments, the machine learning model may determine a set of confidence scores indicative of likelihoods that the VRU appearance may be classified as one or more categories. The VRU appearance analysis module 230 may determine one or more appearance characteristics for the VRU based on the set of probabilities (or confidence scores). The determined one or more characteristics associated with the VRU appearance may (e.g., along with auxiliary data and/or an image and/or bounding box of the VRU) be used by the risk profile module 270 to construct a risk profile for the VRU.

The VRU movement analysis module 240 performs analysis and classifications on movement patterns and postures of VRUs. Certain gestures may correspond to different intentions of a VRU depending on a type of micro-mobility vehicle (e.g., extending one's left arm on a bicycle may indicate an intention for the cyclist to turn left, whereas extending one's left arm on a wheelchair may mean nothing, and the VRU may simply be stretching). A hand-pedaled wheelchair might move their hands similar to a roadside worker who indicates that a train is coming, but the roadside worker will move a lot less quickly. A cyclist leaning to the left indicates they're turning to the left and a person holding their rear rollerblade perpendicular to their movement is trying to brake. Movement can indicate how aggressive someone is and reliability/consistency of someone's movement could impact the uncertainty level of the vehicle predictions. A drunk cyclist will be swerving a lot more, a young rider might make less predictable turns and an elderly person's movement could indicate that they're not that comfortable driving through a busy street.

Figure 5:
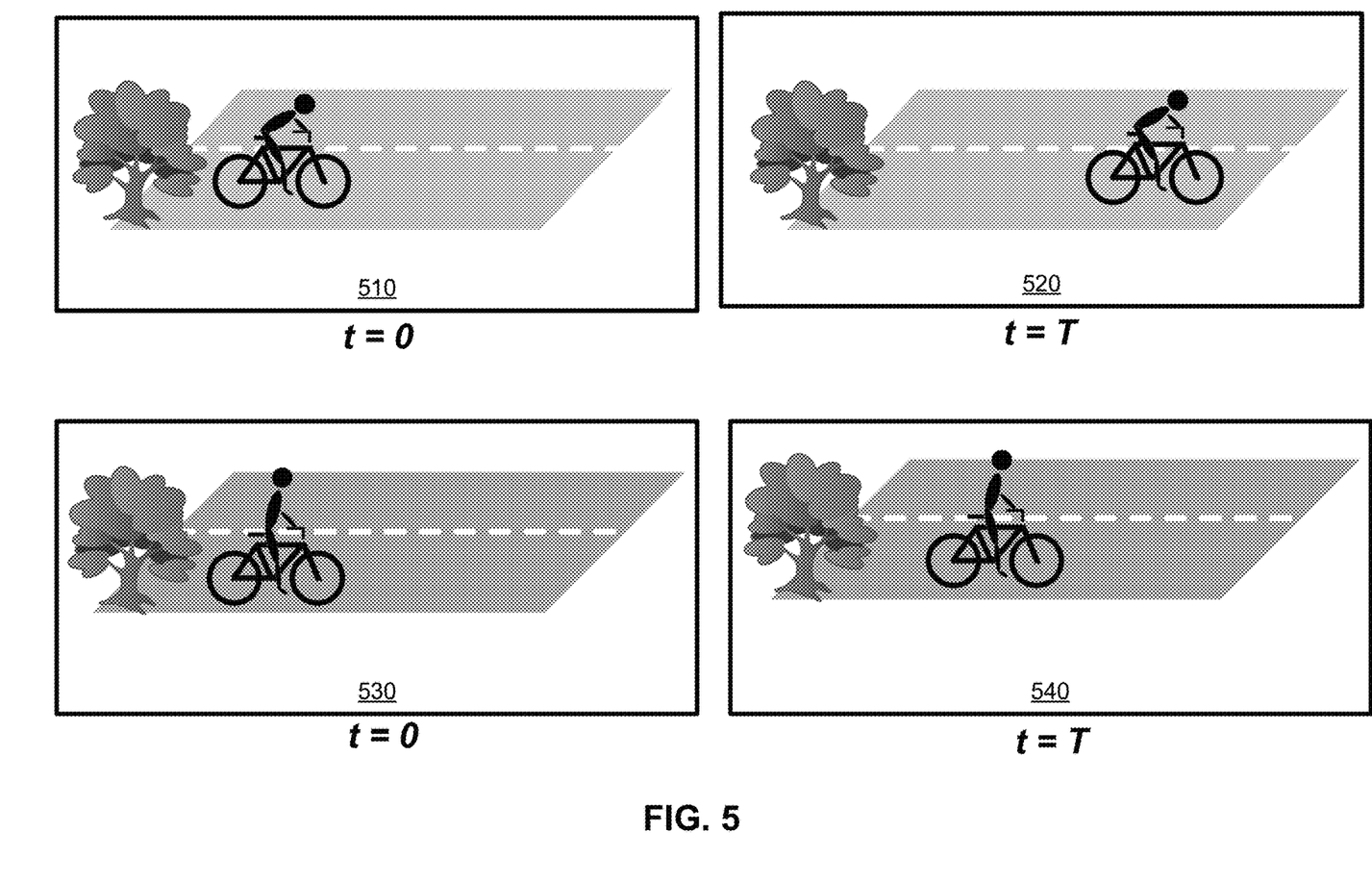
FIG. 5 depicts an exemplary embodiment of identifying a movement associated with the VRU operating the micromobility vehicle in an image, in accordance with one embodiment

FIG. 5 illustrates one example where different postures of a VRU may be used to predict VRU behaviors. For example, as illustrated in FIG. 5, a cyclist with different postures may imply different accelerations, which may be used to predict VRU behaviors. Frames 510 and 520 may be images from a first video stream and frames 530-540 may be images from a second video stream. While only two frames from each video are illustrated in FIG. 5, a sequence of frames depicting movements of the VRU may be used in training the machine learning model and in classifications and predictions. In one embodiment, frames 510-540 are images that serve as training data for training a machine learning model that classifies a leaning position or an upright position. A set of training data may be generated based on the images. For example, the training data may be coordinates for features of interest in the images, where features of interest may be a corner or an endpoint of the limbs of the VRU. The training data are labeled with different labels such as leaning forward/sitting upright or amateur/professional. As illustrated in FIG. 5, the VRU in the first video stream is riding the bicycle while leaning forward, and the VRU in the second video stream is riding the bicycle in an upright position. In a same time period from time t=0 to t=T, the VRU captured in the first video stream with a leaning forward position travels a longer distance compared with the VRU riding with an upright posture. The VRU movement analysis module 270 may train a machine learning model, using labeled training data, to identify whether cyclist is in a certain posture (e.g. lean forward/upright, lean towards left/right which implies making turns). Using the trained model, the VRU movement analysis module 270 may take the image of the VRU and/or bounding boxes as input and classify the posture of the cyclist with one or more postures. The risk profile module 270 may further use the classifications to predict behaviors associated with the VRU, such as acceleration, making left or right turn, etc.

The VRU movement analysis module 270 may use one or more machine learning models that take frames, or sequences of frames, showing VRU movement, as input (and may take auxiliary or additional data as well). The one or more machine learning models may output classifications (or probability distributions, or a combination of both) of users and/or predictions of user behavior based thereon. In one embodiment, the machine learning model may output a set of probabilities each corresponding to a probability that the VRU is predicted to exhibit a certain movement or posture. In some embodiments, the machine learning model may determine a set of confidence scores indicative of likelihoods that the movement associated with the VRU belongs to one or more classification categories. The VRU movement analysis module 270 may determine one or more movements or gestures based on the set of probabilities (or based on confidence scores). The determined VRU movements may be used by the risk profile module 270 for generating the VRU risk profile and predicting VRU behaviors. In addition, the predicted VRU movement and other VRU activity may be used in order to generate a more robust fingerprint of a VRU for tracking purposes, as discussed in The Tracking Patent Application.

Context information extraction module 250 extracts contextual information from images. Contextual information may refer to any information in the image that may help with understanding of the environment that the VRU and the micro-mobility vehicle are framed in. Examples of contextual information that could be extracted from the image may include weather (e.g. rainy or sunny), time of the day (e.g. day or night), location (e.g. in a city or rural area), etc. In one embodiment, context information extraction module 250 may use multiple machine leaning models that are each trained to detect one contextual characteristic of the surroundings, where each machine learning model may be a classifier trained with labeled training data. The retrieved contextual information may be used to predict VRU behaviors. For example, on a rainy day or when the road is wet with puddles, a cyclist may move around to avoid the puddles, or the cyclist may have a higher likelihood to fall, and therefore the driver may need to maintain a wider clearance distance away from the VRU. The extracted contextual information is fed into the behavior prediction module 260 to help make more comprehensive predictions.

Risk profile module 270 consolidates predicted results from modules 210-250 and generates risk profiles for VRUs and micromobility vehicles. In one embodiment, risk profile module 270 may generate a risk profile for the VRU and micro-mobility vehicle identified in the image using information such as classification results outputted by modules 210-250. Risk profile module 270 may generate a vehicle risk profile for the micromobility vehicle and generate a risk profile for the VRU. The risk profile generation process is discussed in further details below.

Risk profile module 270 may generate a risk profile based on a classification (or probability distributions) of vehicle type outputted by the vehicle type analysis module 220. The risk profile may include data such as the micromobility type is a bicycle, and the bicycle is a city shared electric bicycle. Based on the type of the micromobility, risk profile module 270 may further include information such as acceleration capabilities, brake capabilities, range of movement, in the risk profile for the micro-mobility vehicle.

Risk profile module 270 may further include data associated with the VRU in the risk profile, where the data is based on results outputted from modules 220-240. For example, results from the VRU appearance analysis module 230 may be added to the risk profile to include information such as the VRU is dressed in a dressy suit, and results from the VRU movement analysis module may be added to the risk profile to include information such as that VRU is sitting upright on the bicycle, and is checking his smartphone. Furthermore, based on the determined vehicle type, risk profile module 270 may build on the risk profile with user behaviors related to micromobility type because the VRU using the micro-mobility vehicle may exhibit different behaviors based on the type of micromobility vehicle. For example, a skateboarder might move forward while oriented perpendicular to the board's movement. Certain types of micro-mobility also require specific gestures directly from VRUs, such as signaling a right turn on the bike, holding remote control for a motorized skateboard, and a cyclist who doesn't move legs while going forward quickly may indicate that the bicycle is motorized. As yet another example, where someone who is on the floor with the bicycle on top of them is not cycling, it is likely that that VRU fell off their bicycle. There are many unique behaviors to certain types of micromobility such as unlocking a scooter, which might indicate that the vehicle can wait for a bit instead of rerouting, as the VRU will take off soon. A dog in the front of a bicycle basket is not a flying fast dog but needs to be related to the micro-mobility capabilities and movement.

In one embodiment, the risk profile module 270 may include in the risk profile any information outputted by the vehicle type analysis module 220 and any characteristics associated with the type of the micromobility vehicle. The risk profile module 270 may also include in the risk profile any information outputted by the VRU appearance analysis module 230, VRU movement analysis module, and user behavior information associated with the vehicle type information outputted from the vehicle type analysis module 220. The consolidated risk profiles are further passed to the behavior prediction module 260 for predicting VRU behaviors.

Behavior prediction module 260 may train and use one or more machine learning models to predict that a VRU will exhibit a particular behavior based on the risk profiles generated by the risk profile module 270. The outputted results from the module 220-240 can be some example inputs which would be used to build up a better picture of the VRU's characteristics, thus better informing trackability and predictions. Other information can be input into the models, such as, for example, the VRU's movement patterns over time (if the micro-mobility vehicle is travelling with the vehicle for enough frames). In an embodiment, the machine learning model may be a multi-task model as described in the Tracking Patent Application, where different branches are trained to perform different classifications, and the behavior prediction module 260 may use one or more shared layers to form a prediction using information from each of the branches. Behavior prediction module 260 may use a machine learning model including the shared layers (e.g. deep neural network layers) to generate a set of confidence scores each corresponding to a likelihood that the VRU will exhibit one or more behaviors. Behavior prediction module 260 may also use machine learning models to generate a confidence score corresponding to a likelihood that a particular risk (e.g. a risk of collision) is posed by the VRU.

The behavior prediction module 260 combines multiple features in the risk profiles and recognize higher level features such as 'distraction,' or 'a risk for collision.' The behavior prediction module 260 achieves the combining of features in the risk profiles by, for example, using a Probabilistic Graphical Model (PGM) framework. It allows to merge symbolic probabilistic AI and Deep Learning and captures very complex relations between variables which can be specified by the researcher. In addition, it is possible to obtain uncertainty estimates of the model prediction. For instance, by observational studies it is known that distracted persons are more prone to riskier crossing decisions. To predict crossing, the PGM can be used that directly relates a variable with a probability distribution that represents distraction to another variable with a probability distribution that represents crossing intention. Because these variables are not fixed, but a probability distribution, much more complex relationships can be captured, and an uncertainty value can be extracted.

In one embodiment, PGMs include nodes (random variables) and edges (relations between the random variables). There are 2 types of PGMs, Markov network and Bayesian network (e.g., also called Belief Network). A Markov network is a non-directed graph and a Bayesian network is a directed graph (e.g., directed acyclic graph). In some embodiments of the disclosure, Bayesian networks are implemented, as it is likely that the features influence each other unidirectionally. Bayes networks model the joint distribution by decomposing it into factors (which are priors and conditional probabilities) from which posterior probabilities can be obtained. In some embodiments, the systems and methods disclosed herein follow a Bayesian approach. This means that the systems and methods estimate the underlying distribution of the model parameters. An exemplary advantage of this is that the system obtains measures of uncertainty, even at test time (for new observations).

In some embodiments, the model that the image is input into may be a deep learning model or a probabilistic graphical model. The deep learning approach may use a multilayer Recurrent Neural Networks (RNN) with Long Short-Term Memory (LSTM) (+attentional mechanism). Input for the RNN may be a vector of multiple features of a VRU at each frame. Examples of features of each such vectors includes, as depicted, Phone Usage, Gaze Estimation, Body Orientation, Pose Estimation. Deep LSTM model ensures that crucial information that occurred earlier in the time series is not forgotten by performing its analysis on data derived from successive images and feeding the output forward along the network. In an embodiment, attentional mechanisms may be used in order to give higher weights to particular events. Deep LSTM network would learn—by itself—that a person is less risky when they look at the vehicle (e.g., because the VRU is aware of the vehicle's presence), thus applying more weight to whether someone is looking at the vehicle.

Using these approaches has a range of benefits. For example, it allows the system to capture uncertainty, which is crucial for critical decision-making and safety systems— as the vehicle would know how much it can rely on our findings, or whether to rely on alternative sensors (e.g., Lidar). As another example, the systems and methods can discover edge cases and reduce bias more easily, without having to label millions of situations to capture all cases. Additionally, the software is much more interpretable, transparent and we would be able to understand when and why it fails. Moreover, the systems and methods allow one to tune the described models to new environments and additional applications much more quickly and reliably. This approach can be extended with neural networks, which gives one the best of both worlds—flexibility by using neural networks to find the best fitting function, and a Bayesian Network or Dynamic Bayesian Network to generate interpretability.

Further information on combining different classifications into a prediction are discussed in commonly owned U.S.

patent application Ser. No. 17/011,854, filed on Sep. 3, 2020 and titled "Modular Predictions For Complex Human Behaviors", the disclosure of which is hereby incorporated by reference herein in its entirety.

Figure 6:
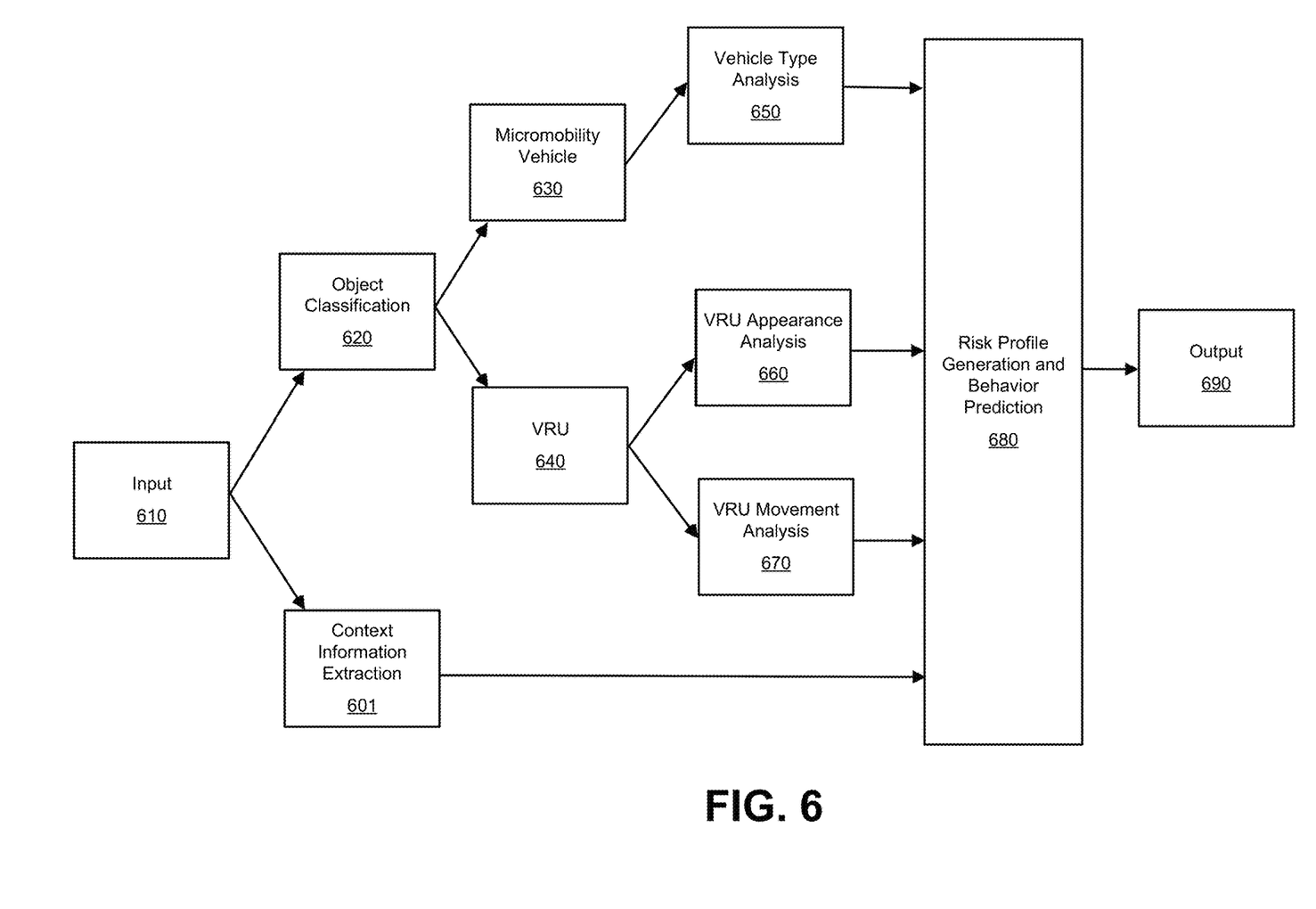
FIG. 6 depicts an exemplary predicting system that generates outputs from inputs, in accordance with one embodiment.

FIG. 6 illustrates an exemplary process that predicts VRU behaviors from receiving input 610 (e.g. videos or images) to generating output 690 (e.g. prediction results). The micromobility risk prediction system 130 may receive input 610 from a camera 110. The input 610 may be a video stream including a sequence of images. Each image may be passed to the object classifying module 210 and may go through an object classification 620 process, where a micromobility vehicle 630 and a VRU 640 may be identified by one or more machine learning models (such as a bounding box classifier) that are trained to detect objects in the images. The vehicle type analysis module 220 may perform vehicle type analysis 650 and classify the identified micromobility vehicle 630 with one or more labels such as bicycle, skateboard, scooter, e-bike, e-scooter, wheelchair, etc. Based on the classified vehicle type, risk profile module 270 may generate a risk profile for the VRU. The risk profile may include data associated with the type of the vehicle such as power, brake capabilities, range of movement, etc. The risk profile may also include data based on classifications (or probability distributions) generated by the vehicle type analysis 650, the VRU appearance analysis 660, and the VRU movement analysis 670, that are performed by modules 220-240 respectively. In one embodiment, the vehicle type analysis 650, the VRU appearance analysis 660, and the VRU movement analysis 670 may generate probability distributions that describe a range of possible values (e.g. characteristics, categories, types, etc.) and corresponding likelihoods. The modules may each use one or more different machine learning models to classify the VRU (or generate probability distributions for the characteristics) as having one or more characteristics such as wearing a Lycra, a hoodie, looking at smart phone, having a certain movement pattern, etc. The risk profile generated based on the outputs from the modules 220-240 are fed into the behavior prediction module 260 for behavior prediction 680, where the behavior prediction module 260 may further generate a confidence score corresponding to a likelihood that the VRU will take a particular action.

In one embodiment, an image with a depiction of the VRU and the micromobility vehicle as a whole is used as input 610, and risk profile generation and behavior prediction 680 is based on one or more machine learning models directly using input 610 (e.g. without first isolating the VRU/vehicle using bounding boxes). For example, a machine learning model may take an image as input. The machine learning model may be a multi-task model with different branches for performing vehicle type analysis 650, VRU appearance analysis 660, and VRU movement analysis 670. The machine learning model may generate a risk profile for the VRU without bifurcating the depictions and characteristics of the VRU and the micromobility vehicle. In some embodiments, the image may include multiple VRUs each operating a micromobility vehicle, and the machine learning model may generate multiple risk profiles and predictions for each VRU, without isolating each VRU and micromobility vehicle and extracting behavior characteristics separately.

Figure 7:
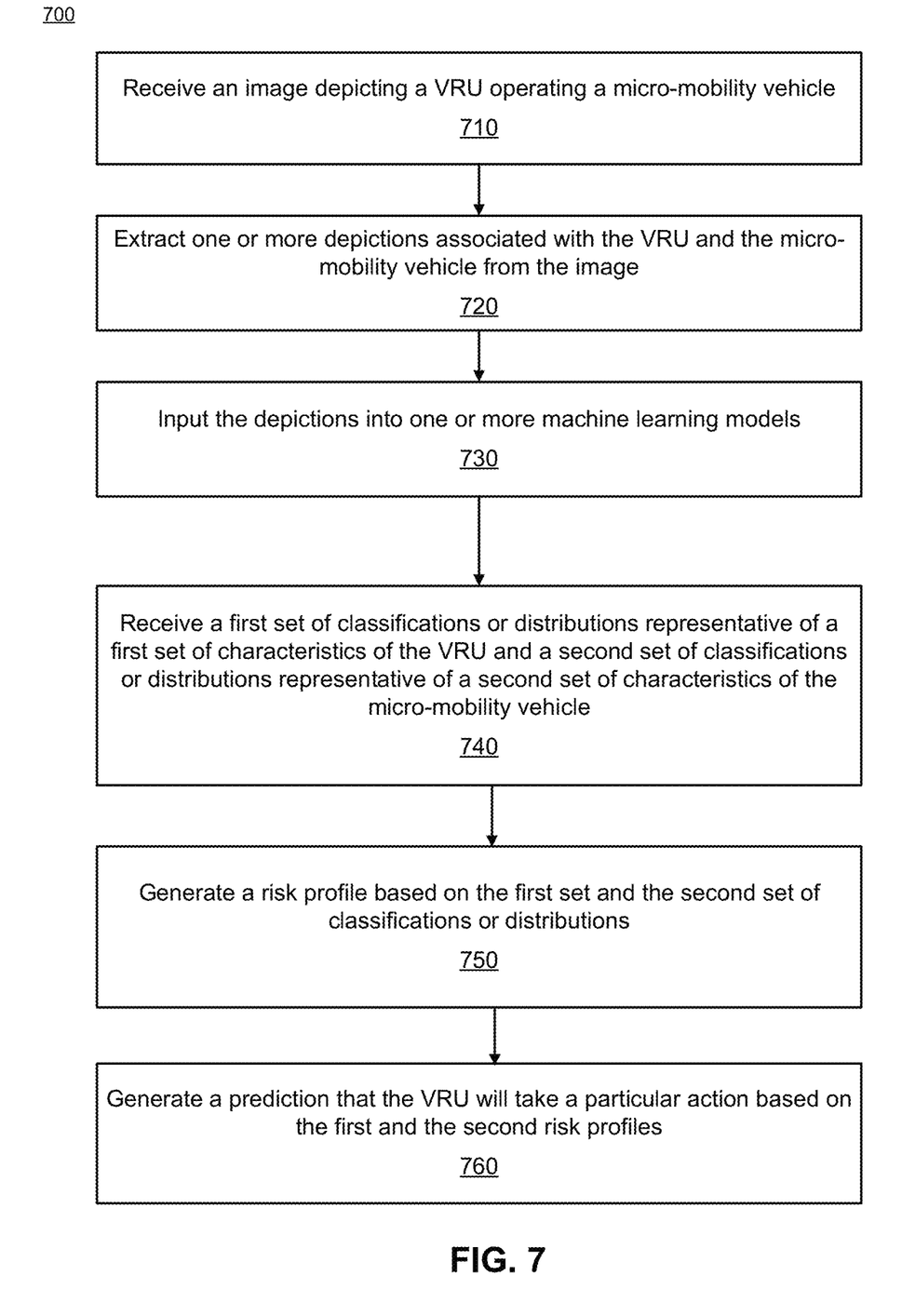
FIG. 7 depicts an exemplary process for determining a probability that a VRU will exhibit a behavior.

FIG. 7 illustrates a general process for predicting a particular behavior of a VRU operating a micromobility vehicle. The process 700 starts with micromobility risk prediction system 130 receiving 710 an image depicting a VRU operating a micro-mobility vehicle. The object classifying module 210 may extract one or more depictions associated with the VRU and the micro-mobility vehicle from the image (e.g. one or more of the following: depiction of the person, depiction of the vehicle, and depiction of the person and the vehicle). The depictions associated with the VRU and the micro-mobility vehicle are inputted 730 into one or more machine learning models (such as the ones included in the vehicle type analysis module 220, VRU appearance analysis module 230, and VRU movement analysis module 240) and may receive, from the one or more machine learning models, a first set of classifications or distributions representative of a first set of characteristics of the VRU and a second set of classifications or distributions representative of a second set of one or more characteristics of the micro-mobility vehicle. The behavior prediction module 260 may generate 750 a risk profile for the VRU based on the first and the second sets of classifications and distributions and may generate 760, based on the risk profile, a prediction that the VRU will take a particular action based on the risk profile.

Example Applications of the Predictions

The prediction results and the risk profiles may be applied on a variety of use cases. In an embodiment, the mobility risk prediction module 130 may be used to inform decisions of an autonomous or semi-autonomous vehicle. The vehicle may base its decisions on prior knowledge such as assumptions about VRU appearance, the type of micro-mobility vehicle, the movement of the micromobility, the movement of the VRU on the micro-mobility, and so on. Each of these behaviors may impact the actions that the vehicle should take, for example: braking, giving way, deploying harm reducing technologies such as airbags in advance, informing emergency services, driving at a different safe speed, increasing lateral space during overtaking, changing route, continuing along their normal path, informing the human driver to be more careful, take over the wheel from the AV, informing vehicles around itself, informing the infrastructure, or communicating to the micro-mobility user itself through auditory, sensory or visual measures. The predictions of VRU behaviors and the risk profiles may also be used in applications such as: sounding alerts to a driver, sending predictions of near misses to insurance companies, using dash camera footage to track vehicle driving activities, providing instructions for a vehicle with ADAS (advanced driver-assistance systems), informing decisions for an intelligent infrastructure system, etc. Heuristics and/or further machine learning models may be trained to cause the VRU to take any given action based on micro-mobility and/or VRU classifications. These models can also run on flying vehicles, mobile phones, dashcams, cloud platforms that analyses videos post-event for insurance purposes, fleet management risk analytics, driver education systems, and infrastructure-based cameras for Intelligent Traffic Systems, V2X communication, urban planning and policy decisions. These models may run in any environment disclosed with respect to the Tracking Patent Application.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for predicting a risk associated with a vulnerable road user (VRU) operating a micro-mobility vehicle, the method comprising:
   receiving, in a video stream, an image depicting the VRU operating the micro-mobility vehicle;
   extracting one or more depictions associated with the VRU and the micro-mobility vehicle from the image;
   inputting the depictions into one or more machine learning models;
   receiving as output, from the one or more machine learning models, a first set of classifications representative of at least an appearance of the VRU and a second set of classifications representative of at least a type of the micro-mobility vehicle, the type describing physical characteristics of the micro-mobility vehicle, the appearance of the VRU predicted from a plurality of candidate appearances of the VRU, each of the plurality of candidate appearances of the VRU representative of a different object worn by the VRU;
   generating a risk profile based on the first set and the second set of classifications; and
   generating a prediction that the VRU will take a particular action based on the risk profile.

2. The method of claim 1, wherein the prediction comprises a confidence score corresponding to a likelihood that a particular risk is posed by the VRU.

3. The method of claim 1, wherein the risk profile is determined by:
   classifying, based on probabilities corresponding to the second set of classifications, a type of the micro-mobility vehicle; and
   determining, based on the type of micro-mobility vehicle, one or more vehicle control parameters associated with the micro-mobility vehicle.

4. The method of claim 3, wherein the vehicle control parameters include one or more of a range of movement, speed capabilities, braking capabilities, and acceleration capabilities.

5. The method of claim 1, wherein the prediction that the VRU will take the particular action is predicted by a machine learned model based on the risk profile.

6. The method of claim 1, further comprising:
   determining, based on the risk profile, a set of instructions for transmission to an autonomous, semi-autonomous vehicle, a vehicle with ADAS (advanced driver-assistance systems), or an intelligent infrastructure system.

7. The method of claim 1, wherein determining the risk profile comprises:
   determining a characteristic associated with appearance of the VRU.

8. The method of claim 1, wherein determining the risk profile comprises:
   determining a movement associated with the VRU operating the micro-mobility vehicle.

9. The method of claim 1, wherein extracting the depiction of the VRU and the depiction of the micro-mobility vehicle from the image is based on one or more bounding polygon classifiers.

10. The method of claim 1, wherein the prediction is further based on contextual information including a time of a day, or location, wherein the contextual information is extracted from the image.

11. The method of claim 1, wherein the output further comprises a first set of distributions representative of the first set of characteristics of the VRU and a second set of distributions representative of the second set of characteristics of the micro-mobility vehicle, and wherein generating the risk profile is further based on the first set and the second set of distributions.

12. A non-transitory computer-readable medium comprising memory with instructions encoded thereon, the instructions causing one or more processors to perform operations when executed, the instructions comprising instructions to:
   receive, in a video stream, an image depicting a vulnerable road user (VRU) operating a micro-mobility vehicle;
   extract one or more depictions associated with the VRU and the micro-mobility vehicle from the image;
   input the depictions into one or more machine learning models;
   receive as output, from the one or more machine learning models, a first set of classifications representative of at least an appearance of the VRU and a second set of classifications representative of at least a type of the micro-mobility vehicle, the type describing physical characteristics of the micro-mobility vehicle, the appearance of the VRU predicted from a plurality of candidate appearances of the VRU, each of the plurality of candidate appearances of the VRU representative of a different object worn by the VRU;

generating a risk profile based on the first set and the second set of classifications; and generate a prediction that the VRU will take a particular action based on the risk profile.

13. The non-transitory computer-readable medium of claim 12, wherein the prediction comprises a confidence score corresponding to a likelihood that a particular risk is posed by the VRU.

14. The non-transitory computer-readable medium of claim 12, wherein the risk profile is determined by:

classifying, based on probabilities corresponding to the second set of classifications, a type of the micro-mobility vehicle; and determining, based on the type of micro-mobility vehicle, one or more vehicle control parameters associated with the micro-mobility vehicle.

15. The non-transitory computer-readable medium of claim 14, wherein the vehicle control parameters include one or more of a range of movement, speed capabilities, braking capabilities, and acceleration capabilities.

16. The non-transitory computer-readable medium of claim 12, wherein the prediction that the VRU will take the particular action is predicted by a machine learned model based on the risk profile.

17. The non-transitory computer-readable medium of claim 12, wherein the instructions further comprise instructions to:

determine, based on the first risk profile, a set of instructions for transmission to an autonomous, semi-autonomous vehicle, a vehicle with ADAS (advanced driver-assistance systems), or an intelligent infrastructure system.

18. The non-transitory computer-readable medium of claim 12, wherein the instructions further comprise instructions to:

determine a characteristic associated with appearance of the VRU.

19. The non-transitory computer-readable medium of claim 12, wherein the instructions further comprise instructions to:

determine a movement associated with the VRU operating the micro-mobility vehicle.

20. A system comprising:

memory with instructions encoded thereon; and one or more processors that, when executing the instructions, are caused to perform operations comprising:

receiving, in a video stream, an image depicting a vulnerable road user (VRU) operating a micro-mobility vehicle;

extracting one or more depictions associated with the VRU and the micro-mobility vehicle from the image;

inputting the depictions into one or more machine learning models;

receiving as output, from the one or more machine learning models, a first set of classifications representative of at least an appearance of the VRU and a second set of classifications representative of at least a type of the micro-mobility vehicle, the type describing physical characteristics of the micro-mobility vehicle, the appearance of the VRU predicted from a plurality of candidate appearances of the VRU, each of the plurality of candidate appearances of the VRU representative of a different object worn by the VRU;

generating a risk profile based on the first set and the second set of classifications; and generating a prediction that the VRU will take a particular action based on the risk profile.

* * * * *